United States Patent [19]

Sakamoto

[11] Patent Number: 5,260,743
[45] Date of Patent: Nov. 9, 1993

[54] ELECTROPHOTOGRAPHIC APPARATUS INCLUDING AN ATTACHMENT DEVICE FOR ENABLING THE APPARATUS TO PERFORM ADDITIONAL FUNCTIONS

[75] Inventor: Masashi Sakamoto, Toyohashi, Japan

[73] Assignee: Minolta Camera Kabushiki Kaisha, Osaka, Japan

[21] Appl. No.: 947,504

[22] Filed: Sep. 17, 1992

[30] Foreign Application Priority Data

Sep. 18, 1991 [JP] Japan .................. 3-237640

[51] Int. Cl.$^5$ ............................................ G03G 15/00
[52] U.S. Cl. .................... 355/202; 355/210; 346/153.1
[58] Field of Search ............. 355/202, 200, 210, 228; 346/153.1, 160

[56] References Cited

U.S. PATENT DOCUMENTS 4,873,548 10/1989 Kobayashi et al. ............... 355/200

FOREIGN PATENT DOCUMENTS 62-61078 3/1987 Japan .
62-94338 6/1987 Japan .
3-72336 3/1991 Japan .

Primary Examiner—R. L. Moses
Attorney, Agent, or Firm—Willian Brinks Olds Hofer Gilson & Lione

[57] ABSTRACT

An electrophotographic apparatus having a first frame accommodating an exposure head which emits a light according to digital image data and a second frame accommodating a photosensitive member on which an electrostatic latent image is formed with a light emitted from the exposure head to the photosensitive member at an exposure portion. The first frame is openably supported by the second frame. When the first frame is opened relative to the second frame, the exposure head is released from the photosensitive member and thereby a document exposing unit including a transport system for transporting a document and an exposure optical system for exposing the photosensitive member to an optical image of the document being transported by the transport system is mountable at the exposure portion.

9 Claims, 21 Drawing Sheets

ELECTROPHOTOGRAPHIC APPARATUS INCLUDING AN ATTACHMENT DEVICE FOR ENABLING THE APPARATUS TO PERFORM ADDITIONAL FUNCTIONS

BACKGROUND OF THE INVENTION

1. Field of the Invention

The present invention relates to electrophotographic apparatus, and more particularly to electrophotographic apparatus which have a body comprising a lower frame and an upper frame openably connected to the lower frame, and an electrophotographic mechanism for forming copy images by exposing a photosensitive member to image forming light from an exposure head to form an electrostatic latent image thereon, developing the latent image to a visible image and transferring the image to a copy sheet.

2. Description of the Related Art

Such electrophotographic apparatus are already used and proposed for use as laser beam printers which are used as connected to a host computer, personal computer or other computer, printers of facsimile systems, etc.

With the electrophotographic apparatus mentioned, the upper frame of its body is divided from the lower frame thereof along a sheet transport path for discharging therethrough the sheet having a copy image transferred thereto by the electrophotographic mechanism so that the sheet transport path can be opened and closed. This structure for opening and closing the path serves to facilitate the procedure to be followed when the path is jammed with the copy sheet.

The photosensitive member of the electrophotographic mechanism and the image forming devices thereof around the photosensitive member are further provided in the form of an image forming unit which is removable or replaceable to ensure the ease of maintenance.

With electrophotographic printers of the type mentioned placed into wider use, these printers are made more compact and lightweight and less costly. Following this trend, such printers are made monofunctional with its essential mechanism compacted to the greatest possible extent.

On the other hand, however, multifunctional electrophotographic printers are also required for convenience of use. It is therefore required to develop electrophotographic printers which are reduced in size, weight and cost and which have more functions.

SUMMARY OF THE INVENTION

The main object of the present invention is to provide an electrophotographic apparatus which is reduced in size, weight and cost and which nevertheless has a multiplicity of functions.

Another object of the invention is to provide an electrophotographic apparatus which can be readily restored in the event of jamming, is easy to maintain and yet has a multiplicity of functions.

Still another object of the invention is to provide an electrophotographic apparatus which comprises a small-sized, lightweight and inexpensive main body having an essential construction compacted to the greatest possible extent for serving a single function, and a simplified attachment device usable in combination therewith when required and enabling the apparatus to perform other functions.

These objects of the invention are accomplished by providing an electrophotographic apparatus comprising:

a first frame having accommodated therein an exposure head, a second frame having the first frame connected thereto openably and having accommodated therein a photosensitive member and image forming means for forming a visible image by developing an electrostatic latent image formed on the photosensitive member with image forming light emitted from the exposure head, an open portion to be formed in the vicinity of an exposure portion of the photosensitive member in the second frame when the first frame is opened relative to the second frame, and a document exposure unit mountable in the open portion and including a transport system for transporting document and an exposure optical system for exposing the photosensitive member to an optical image of the document being transported by the transport system.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DESCRIPTION OF THE PREFERRED EMBODIMENTS

Embodiments of the present invention will be described below in detail with reference to the drawings.

Figure 1:
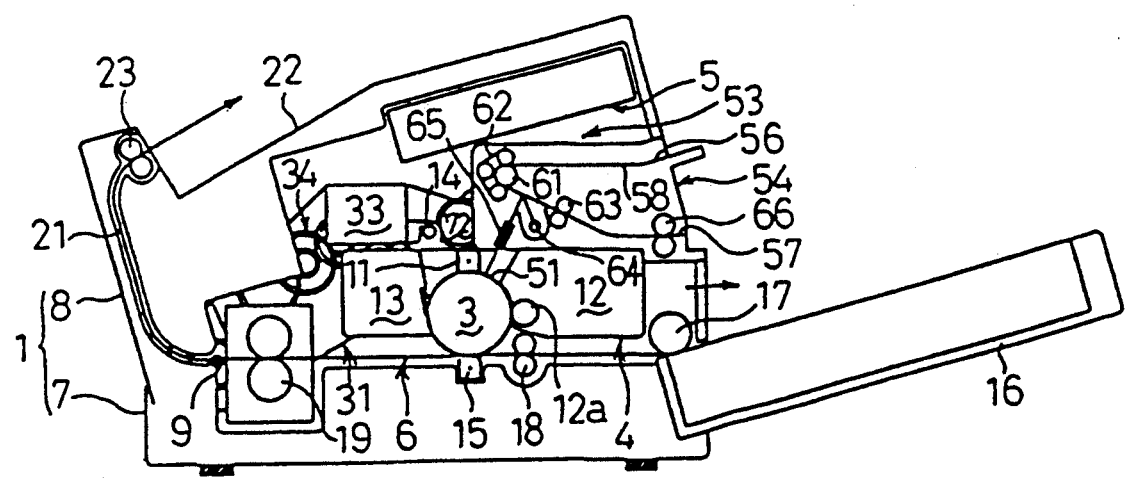
FIG. 1 is a diagram showing an electrophotographic apparatus embodying the invention and as seen from the front side, the apparatus being shown in a copying machine mode.

FIG. 1 schematically shows the construction of an electrophotographic apparatus embodying the invention. This apparatus comprises in combination a laser beam printer main body 1, and a document exposure unit 54 which can be installed in or removed from the printer main body 1 as required.

Figure 2:
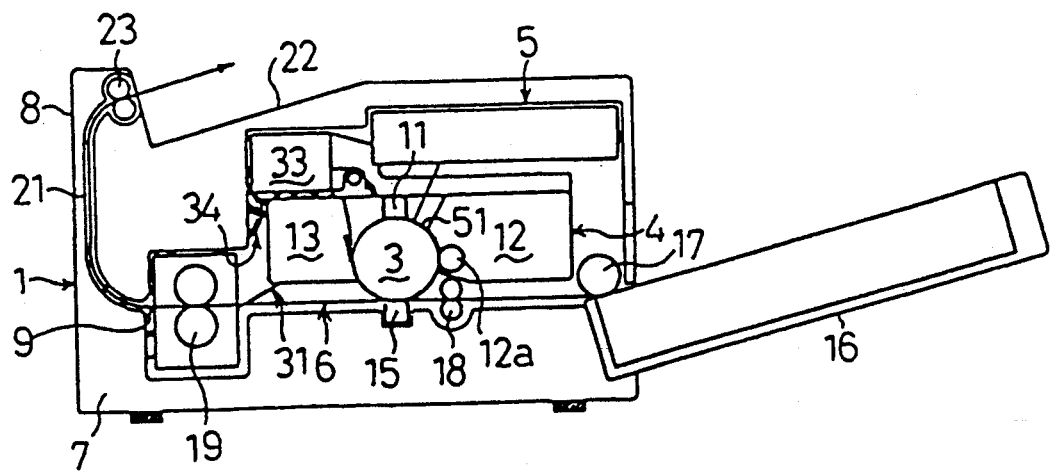
FIG. 2 is a diagram showing the apparatus in a printer mode.

With reference to FIG. 2, the laser beam printer main body 1 has as electrophotographic mechanisms an image forming unit 4 including a photosensitive drum 3 for forming images thereon, and a laser beam scanner 5 for exposing the photosensitive drum 3 of the unit 4 to a beam for image formation.

The printer main body 1 has a transport path 6 through which a sheet is transported for use in transferring the image from the drum 3 of the unit 4 thereto. The printer body 1 is divided into a lower frame 7 and an upper frame 8 along the path 6.

The upper frame 8 is connected to the lower frame 7 by a hinge pin 9 at one end of the body 1 and is upwardly openable or downwardly closable relative to the lower frame 7 by being pivotally moved about the hinge pin 9.

The image forming unit 4 comprises the drum 3, and a sensitizing charger 11, developing device 12 and cleaner 13 which are arranged around the drum 3. The unit 4 is provided in the upper frame 8 along with the laser beam scanner 5 and another component of the electrophotographic mechanism, i.e., an eraser lamp 14.

The eraser lamp 14 is opposed to the portion of the drum 3 between the cleaner 13 and the charger 11. After the cleaner 13 and the eraser lamp 14 remove residual toner or charge from the surface of the drum 3, the drum surface is uniformly charged by the sensitizing charger 11 and then exposed to an image forming beam from the scanner 5, whereby an electrostatic latent image is formed in accordance with an image signal modulating the laser beam from the scanner 5.

The portion 51 of the drum 3 to be exposed to the beam is positioned between the charger 11 and the developing device 12 around the drum 3 and left exposed at the upper side of a case for the image forming unit 4.

The electrostatic latent image formed on the photosensitive drum 3 is developed to a visible image by the developing device 12 and transferred onto a sheet as stated above.

For the transfer of the image, the lower frame side of the transport path 6 is provided with a transfer charger 15 as opposed to the portion of the drum 3 positioned between the developing device 12 and the cleaner 13. A paper cassette 16 is disposed at the upstream end of the transport path 6 on the lower frame side thereof.

Copy sheets placed in the paper cassette 16 are sent out one by one by a feed roller 17. Timing rollers 18 provided on the lower frame side of the transport path 6 act to register the leading end of the sheet with the forward end of the visible image to be transferred from the drum 3.

Disposed downstream from the transfer charger 15 on the lower frame side of the path 6 are fixing rollers 19 for fixing the transferred image to the sheet transported to the rollers.

At the downstream side of the fixing rollers 19, the transport path 6 is connected to a discharge path 21 which extends vertically along one end of the upper frame 8 and through which the copy sheet as treated by fixing is discharged onto a paper tray 22 provided on the top side of the upper frame 8.

Arranged at the terminal end of the discharge path 21 are discharge rollers 23, whereby the copy sheet can be discharged onto the tray 22 reliably after fixing.

Figure 4:
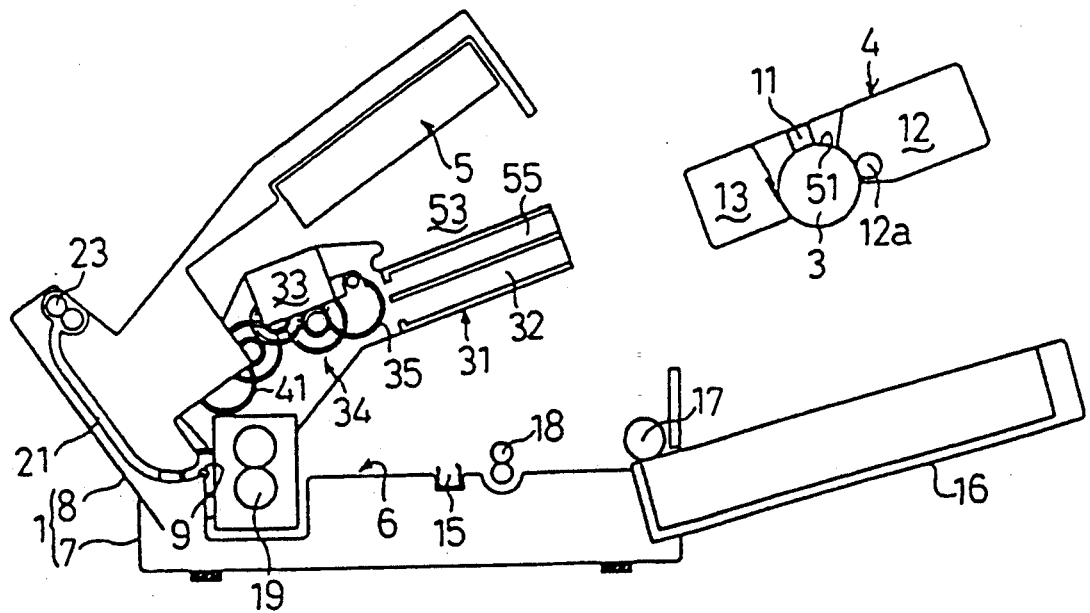
FIG. 4 is a diagram showing the apparatus of FIG. 3 with an image forming unit separated therefrom.
Figure 5:
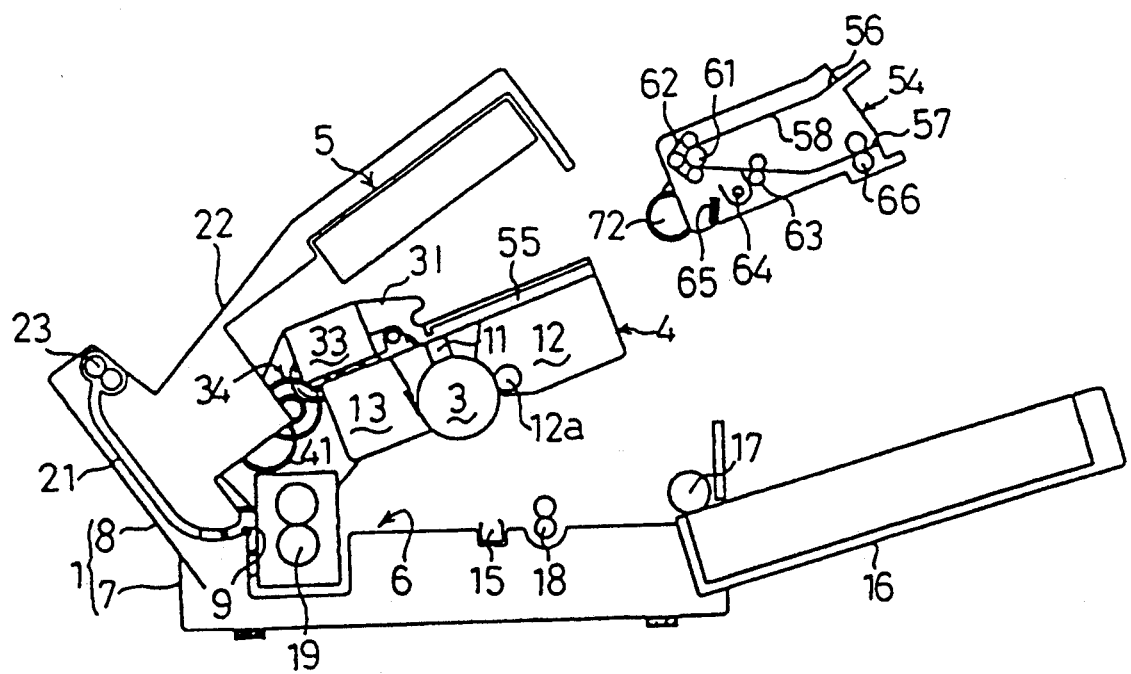
FIG. 5 is a diagram showing the apparatus of FIG. 1 with a document exposure unit separated therefrom.

The upper frame 8 has the laser beam scanner 5 as fixed to its uppermost portion. The upper frame 8 further has a movable frame 31 supported by or connected to the frame 8 and movable about the hinge pin 9 upward into contact therewith or downward away therefrom (FIGS. 4 and 5). The image forming unit 4 is removably supported by the movable frame 31.

To support the unit 4, the movable frame 31 has a guide groove 32 in which the unit 4 is fittable (FIG. 4).

Figure 3:
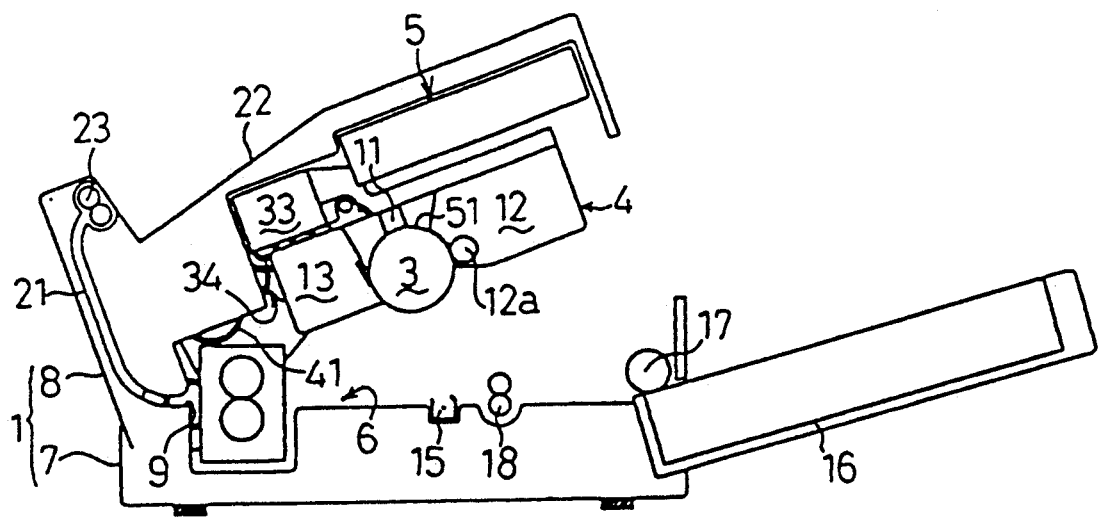
FIG. 3 is a diagram showing the apparatus in the printer mode with an upper frame opened.

With the upper frame 8 upwardly opened relative to the lower frame 7 as shown in FIGS. 3 and 4, the movable frame 31 is moved from a raised position shown in FIG. 3 to a lowered position shown in FIG. 4, whereby the exposure portion 51 is greatly opened to the outside to provide an open exposure portion 53 between the laser beam scanner 5 on the upper frame 8 and the image forming unit 4 supported on the movable frame 31.

Figure 6:
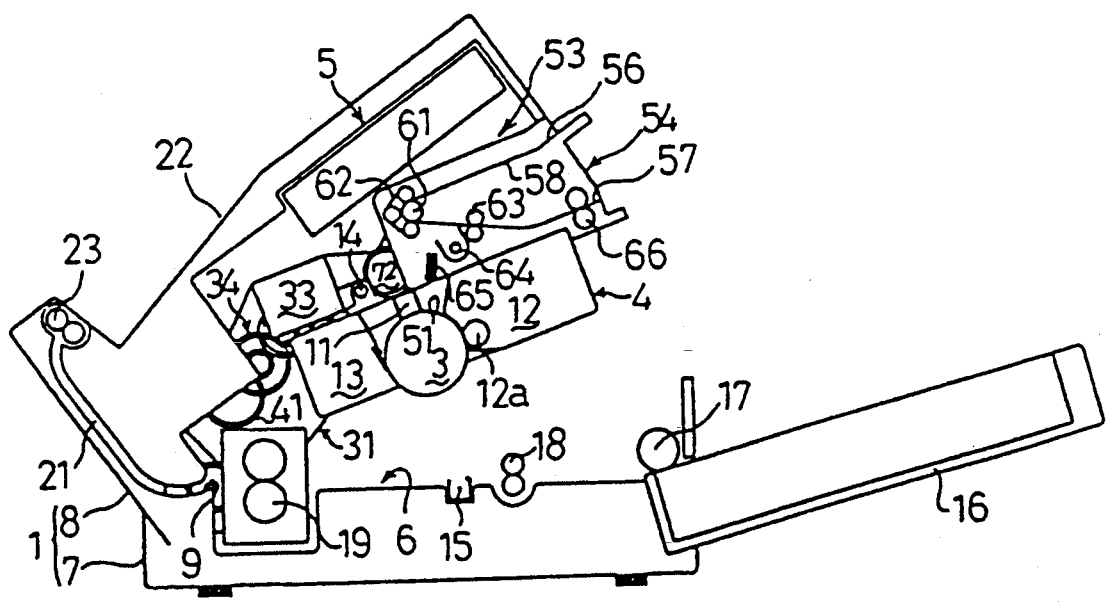
FIG. 6 is a diagram showing the apparatus of FIG. 1 with its upper frame opened.

In the state wherein the open exposure portion 53 thus formed, the document exposure unit 54 can be removably installed in the printer main body 1 to expose the photosensitive drum 3 of the image forming unit 4 on the movable frame 31 to optical images of documents instead of the image forming beam from the laser beam scanner 5 (FIGS. 5 and 6).

For this purpose, the movable frame 31 is formed, above the image forming unit supporting position, with a guide groove 55 for the document exposure unit 54 to removably fit in (FIGS. 4 and 5).

With reference to FIG. 1, FIG. 5, etc., the document exposure unit 54 is formed, in its rear end (as the unit is viewed in the direction of installation thereof toward the drum 3), with a document inlet 56 at an upper portion for documents to be manually inserted therethrough, and a document outlet 57 at a lower portion. The unit 54 further has a document transport path 58 through which the document manually inserted into the inlet 56 is caused to make a U-turn within the unit 54 and discharged from the outlet 57.

The U-turn portion of the document transport path 58 is provided with a transport assembly comprising document feed rollers 61 and a document feed belt 62 in combination. The document manually inserted into the path is transported downstream by the assembly. Arranged between the transport assembly and document transport rollers 63 downstream therefrom are an exposure lamp 64 for illuminating the document being transported, and a converging lens array 65 by which an image of the document being illuminated during transport is projected as focused onto the exposure portion 51 of the drum 3 opposed to the document.

Thus, the entire image of the manually inserted document is projected from portion to portion onto the photosensitive drum 3 by the so-called document moving scanning method wherein the document is moved, whereby an image is formed on the drum 3 in conformity with the document.

Disposed close to the document outlet 57 of the transport path 58 are document discharge rollers 66 for reliably discharging the document from the unit 54 after exposure.

The upper frame 8 is held in its opened position by being biased by unillustrated means. However, when the document exposure unit 54 is not mounted on the movable frame 31 as seen in FIG. 3, the upper frame 8 is closed relative to the lower frame 7 as shown in FIG. 2 by being moved down against the biasing force.

Upon the upper frame 8 reaching a specified closed position on the lower frame 7, a known but unillustrated engaging claw on the upper frame 8 comes into engagement with an engaging portion on the lower frame 7, whereby the upper frame 8 is held in the closed position on the lower frame 7.

When the movable frame 31 is in its raised position relative to the upper frame 8 as shown in FIGS. 2 and 3, the laser beam scanner 5 fixedly mounted on the upper frame 8 and the image forming unit 4 are so positioned relative to each other that the drum 3 of the unit 4 is exposed to the image forming beam from the scanner 5, and the apparatus is in condition for printing when the upper frame 8 is in the closed position shown in FIG. 2.

Figure 7:
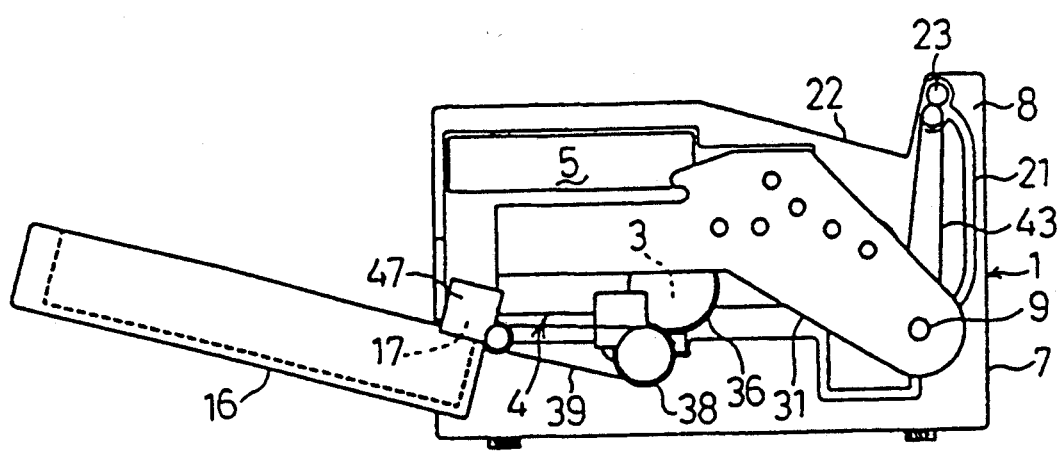
FIG. 7 is a rear view schematically showing the apparatus of FIG. 2.
Figure 8:
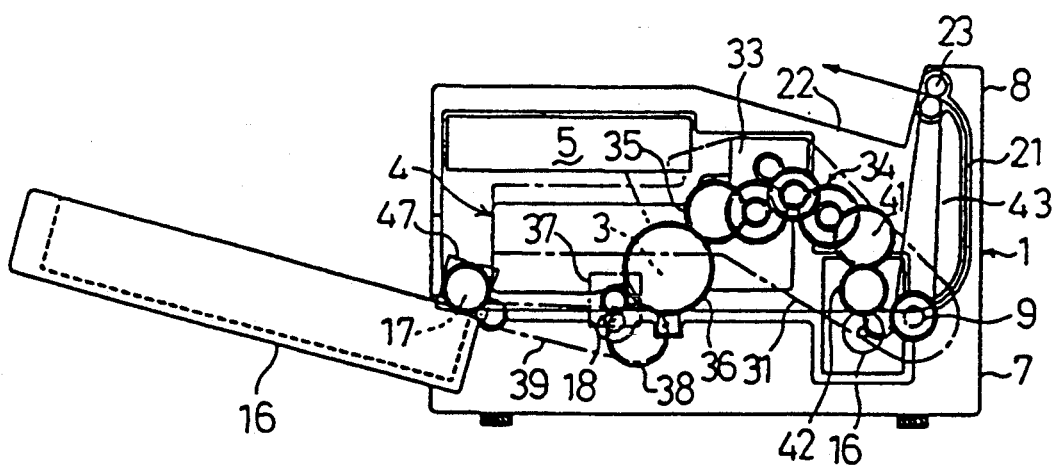
FIG. 8 is a diagram of a drive system of the apparatus as shown in FIG. 2 and seen from the rear side.
Figure 9:
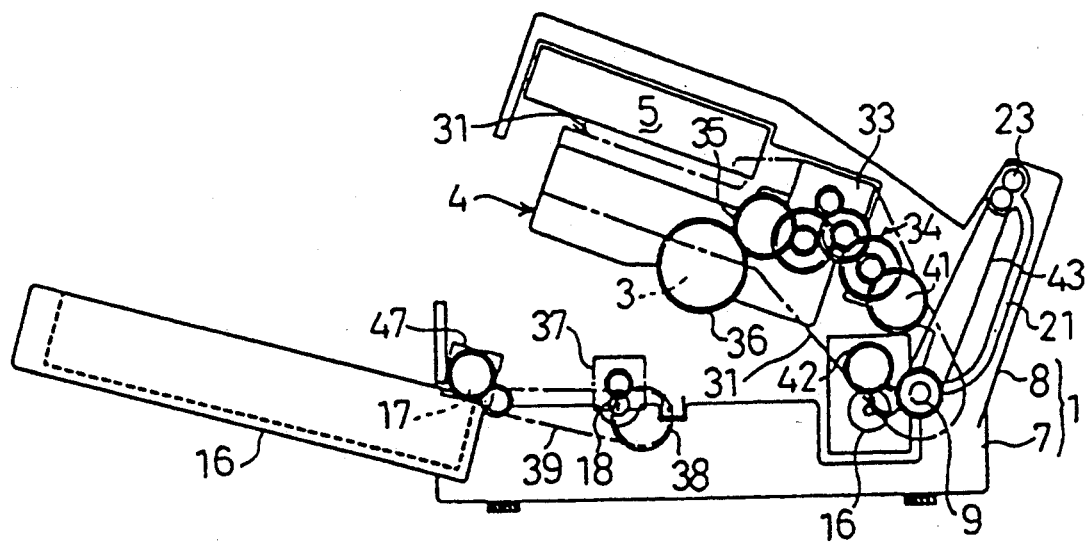
FIG. 9 is a diagram of the drive system of the apparatus shown in FIG. 3 and as seen from the rear side.
Figure 10:
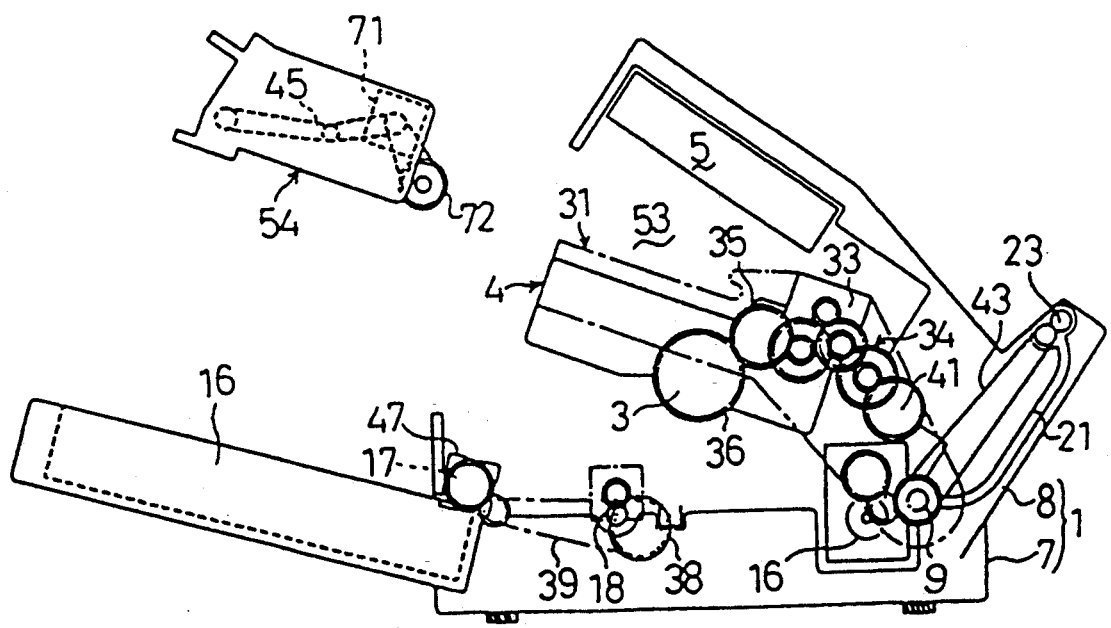
FIG. 10 is a diagram of the drive system of the apparatus shown in FIG. 5 and as seen from the rear side.

The drive system of the apparatus will be described next with reference to FIGS. 7 to 13, which show the laser beam printer main body 1 and the document exposure unit 54 of FIGS. 1 to 6 as they are seen from the rear side. FIGS. 7 and 8 correspond to FIG. 2. FIG. 9 corresponds to FIG. 3, FIG. 10 to FIG. 5, FIG. 11 to FIG. 1, FIG. 12 to FIG. 6, and FIG. 13 to FIG. 4.

The movable frame 31 has mounted thereon a motor 33, the main component of the drive system, and a drive gear train 34 coupled to the motor (see FIGS. 7 and 8).

The image forming unit 4 is provided with a drum gear 36 which is rotatable in mesh with an image forming unit drive gear 35 of the gear train 34 when the unit 4 is mounted on the movable frame 31. The gear 36 is brought into meshing engagement with the gear 35 by the image forming unit 4 being mounted on the movable frame 31 to make the movable portions of the drum 3, the developing device 12, etc. on the unit 4 drivable. The drum gear 36 is connected directly to the drum 3 (FIGS. 8 to 12).

When the upper frame 8 is positioned in place as closed relative to the lower frame 7, with the movable frame 31 in its raised position relative to the upper frame 8, the movable frame 31 is positioned in place relative to the lower frame 7 as specified (FIGS. 1, 2, 7, 8 and 11).

With the movable frame 31 in the specified position, the drum gear 36 is in mesh with a driven gear 38 on the lower frame 7 to transmit the rotation of the motor 33 to the driven gear 38. The driven gear 38 on the lower frame is coupled to the timing rollers 18 by a timing roller clutch 37 to drive these rollers suitably (see FIGS. 8 and 11).

Figure 11:
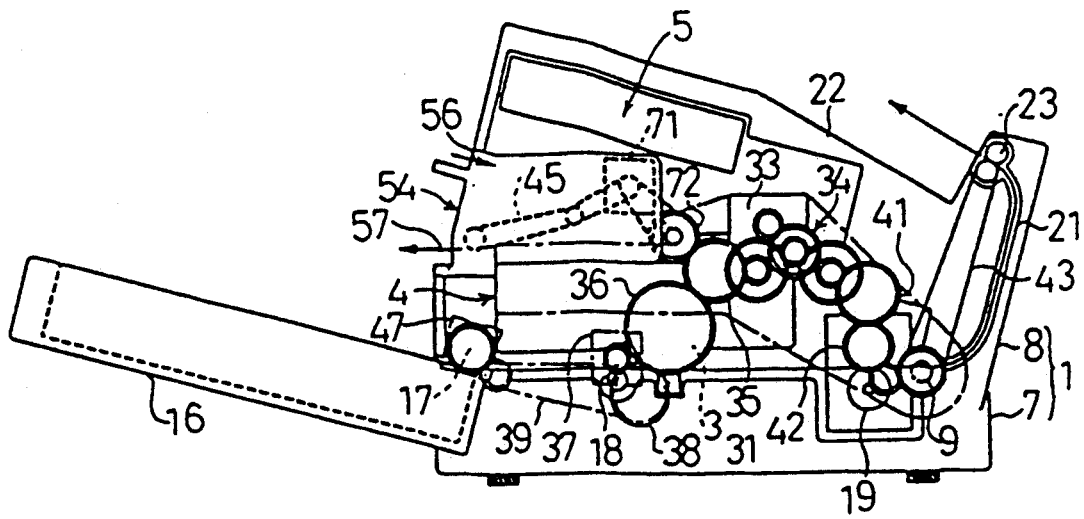
FIG. 11 is a diagram of the drive system of the apparatus shown in FIG. 1 and as seen from the rear side.
Figure 12:
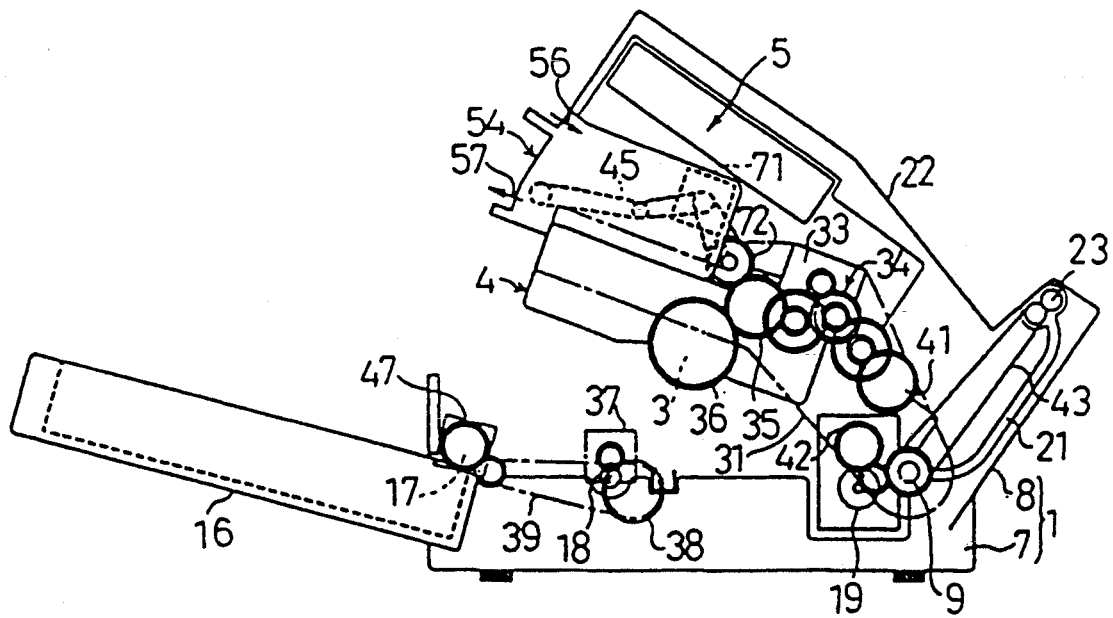
FIG. 12 is a diagram of the drive system of the apparatus shown in FIG. 6 and as seen from the rear side.
Figure 13:
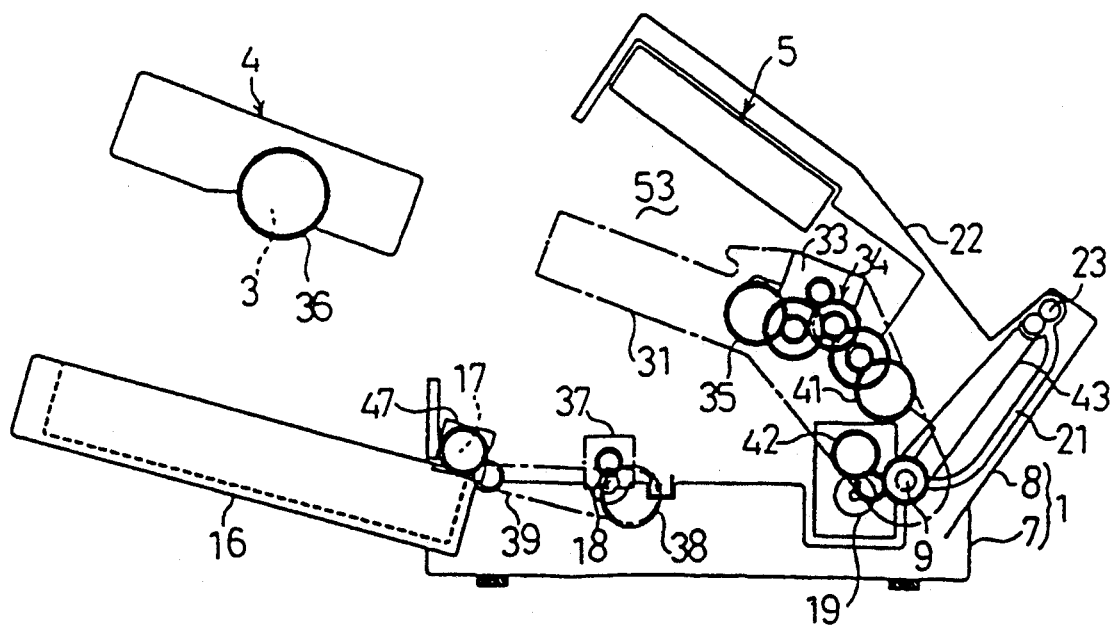
FIG. 13 is a diagram of the drive system of the apparatus shown in FIG. 4 and as seen from the rear side.

With reference to FIGS. 8 and 11, the driven gear 38 on the lower frame is coupled also to a paper feed drive system 30 for transmitting rotation to the feed roller 17 on the lower frame 7 via a feed clutch 47. The feed roller 17 can therefore be driven suitably by the rotation of the motor 33 transmitted thereto via the feed clutch 47.

The drive gear train 34 has a fixing drive gear 41 as shown in FIGS. 8 to 13. When the movable frame 31 is in the specified position relative to the lower frame 7, the fixing drive gear 41 is in mesh with a fixing gear 42 coouplled to the fixing rollers 19 to drive the fixing rollers 19 by transmitting the rotation of the motor 33 thereto.

The fixing gear 42 is coupled also to a paper discharge drive system 43 provided along the discharge path 21, causing the system 43 to drive the discharge rollers 23.

With reference to FIG. 11, the document exposure unit 54 has a document feed driven gear 72 coupled via a document feed clutch 71 to a document drive system 45 for the document transport path 58. When the document exposure unit 54 is mounted on the movable frame 31, the driven gear 72 meshes with the image forming unit drive gear 35 of the drive gear train 34, whereby the rotation of the motor 33 can be transmitted to the drive system 45 for the path 58 via the feed clutch 71.

Figure 14:
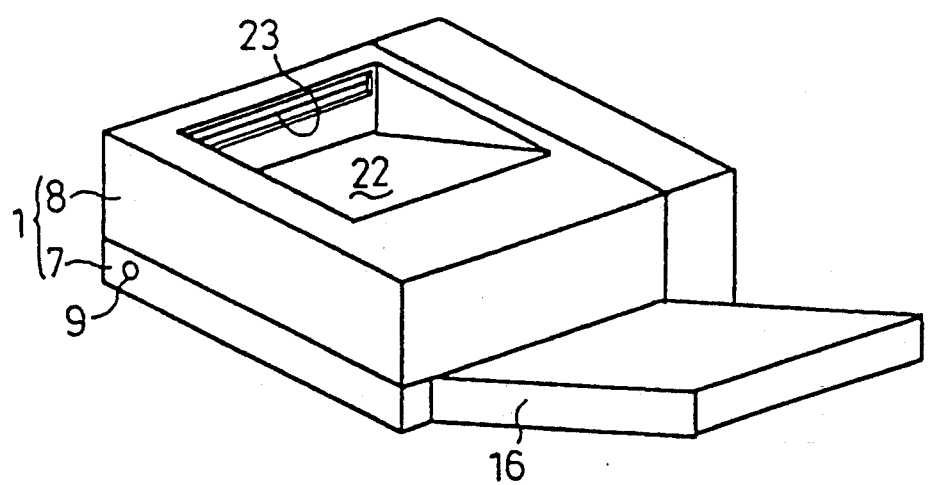
FIG. 14 is a perspective view of the apparatus shown in FIGS. 2 and 8.
Figure 15:
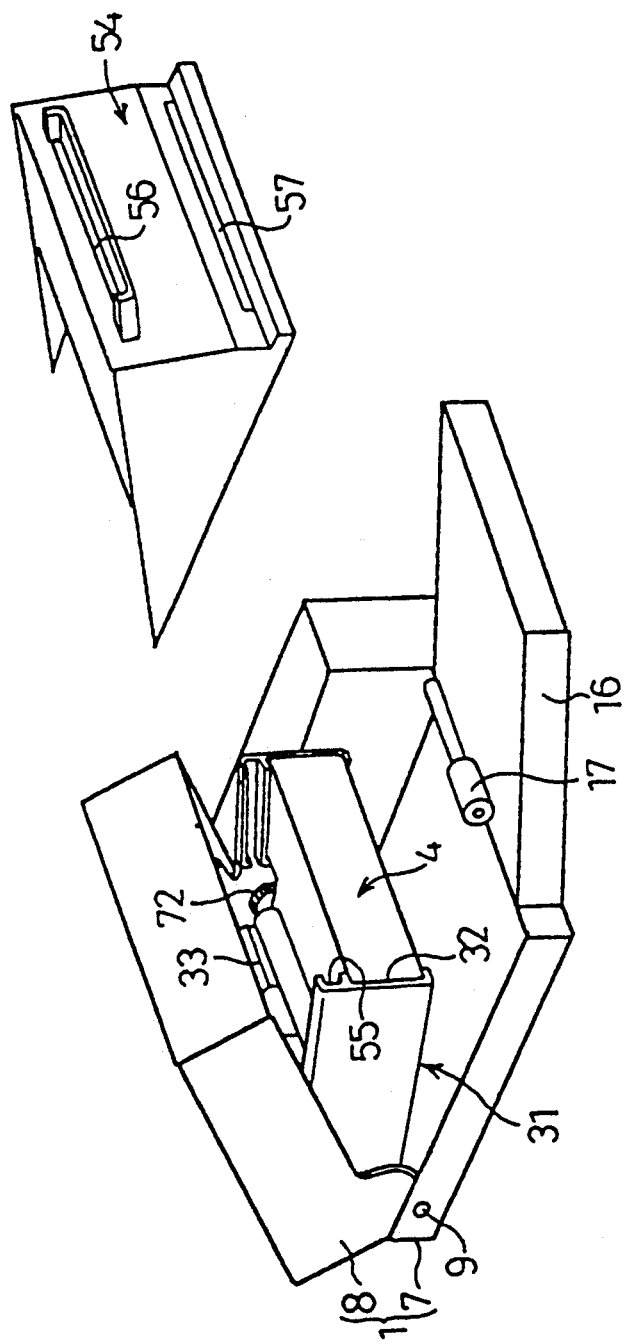
FIG. 15 is a perspective view of the apparatus shown in FIGS. 4 and 13.
Figure 16:
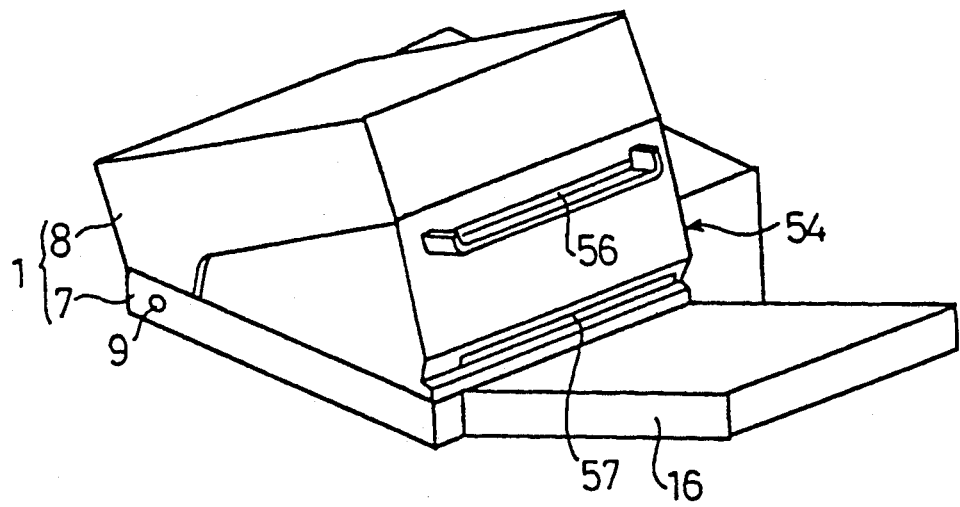
FIG. 16 is a perspective view of the apparatus shown in FIGS. 1 and 11.

FIG. 14 shows the present apparatus in a printer mode in which the laser beam printer main body 1 is singly in use. FIG. 15 shows the printer main body 1 and the document exposure unit 54 as removed from the body 1. FIG. 16 shows the apparatus in a copying machine mode in which the document exposure unit 54 is in combination with the printer main body 1 for use.

In the case of the present embodiment, the so-called negative-positive developing method is used in the printer mode, while the so-called positive-positive developing method is used in the copying machine mode in which images are formed by optical images projected from the document exposure unit 54.

To reproduce with fidelity the original image corresponding to one scan line of the laser beam from the scanner 5 in the printer mode, toner is deposited on the portion of the drum 3 illuminated with the laser beam, whereby a visible image is formed.

In the copying machine mode, on the other hand, the image area of the document does not reflect the light of the exposure lamp 64, which therefore does not impinge on the corresponding portion of the drum surface. Accordingly, to produce a copy image in conformity with the document, toner needs to be deposited on the portion on which no light impinges.

With the present embodiment, therefore, the developing method is changed when one of the printer mode and the copying machine mode is changed over to the other mode.

The photosensitive drum 3 for use in the present embodiment should have nearly the same chargeability irrespective of whether it is charged positively or negatively and sensitivity to the laser beam which is infrared radiation and the visible light of exposure lamp 64 of the document exposure unit 54 alike, i.e., such characteristics that when exposed to the light of either type, the drum becomes electrically conductive at the exposed portion.

Further the toner for developing the electrostatic latent image on the drum 3 is to be negatively charged in the developing device 12.

Described below are the developing method in the printer mode and the developing method in the copying machine mode.

Figure 17:
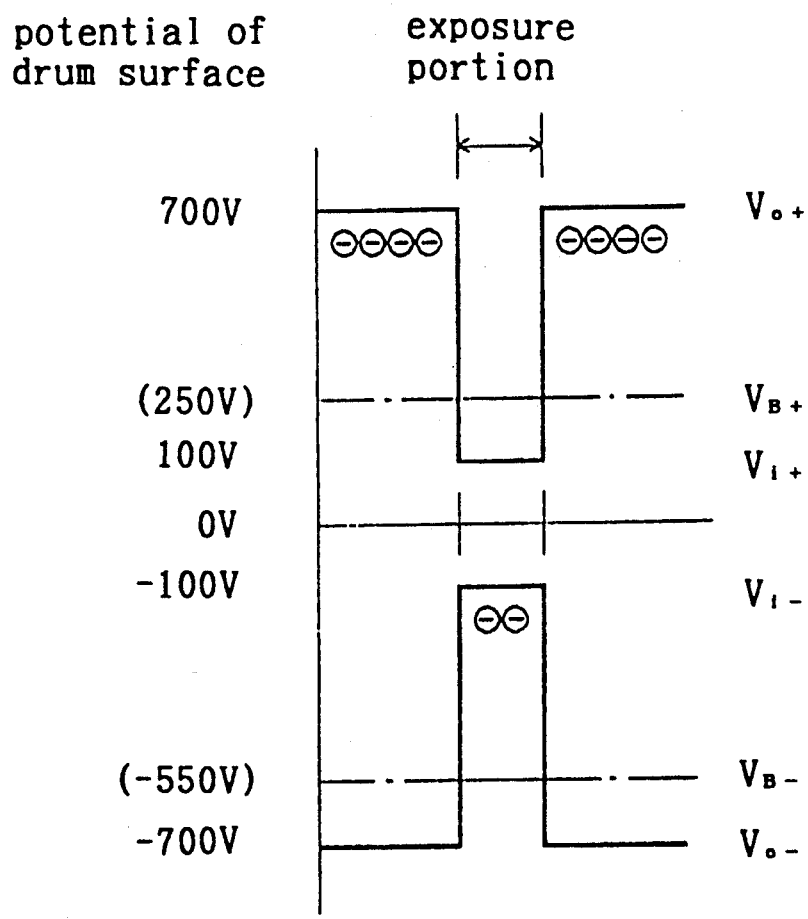
FIG. 17 is a graph showing the potential of a charged area and a light-exposed area on a photosensitive drum in the printer mode in comparison with the corresponding potential in the copying machine mode.

The negative-positive developing method in the printer mode is illustrated in the portion of FIG. 17 below the zero-volt line. In the printer mode, the drum 3 of the apparatus is charged by the sensitizing charger 11 to $-700$ V, while the portion of the drum exposed to the scanning laser beam has its potential reduced to about $-100$ V.

When developing bias of $-550$ V is applied to the developing roller 12a of the developing device 12 in this developing process, a potential gap of 450 V occurs relative to the exposed portion of $-100$ V, permitting deposition of the negatively charged toner in the developing device 12 on the drum 3.

Thus, the toner is deposited on the potential-free area on the drum 3, i.e., on the area of a negative latent image.

The positive-positive developing method in the copying machine mode is illustrated in the other portion of FIG. 17 above the zero-volt line. Contrary to the above case, the toner is deposited on the unexposed area on the drum 3 positively charged to 700 V, i.e., on the potential-retaining area of a positive latent image.

As will be apparent from the above description, the printer mode requires three power sources, i.e., a negative high-voltage power source for charging the photosensitive drum 3, a negative developing bias power source and a positive high-voltage power source for transferring the deposited toner from the drum 3 to the copy sheet.

Figure 18:
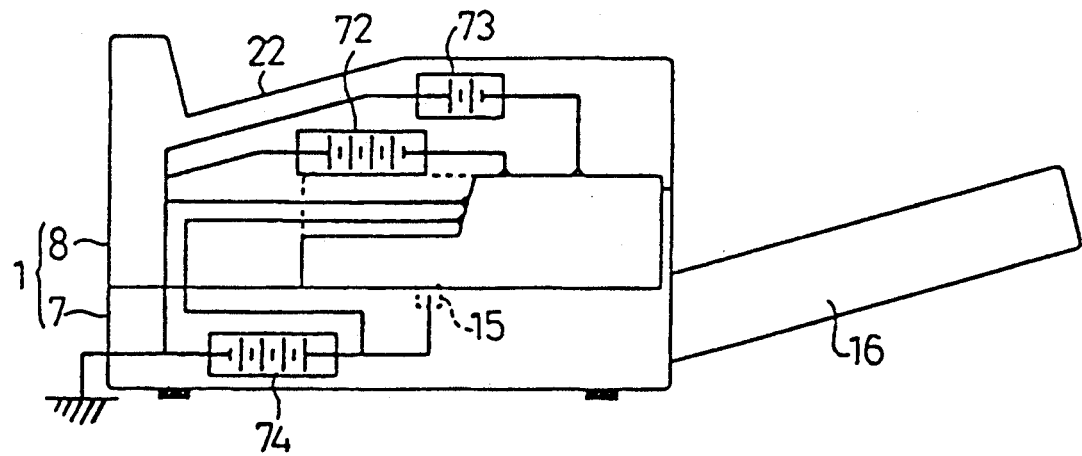
FIG. 18 is a diagram showing power sources of the apparatus shown in FIG. 2 with the image forming unit removed therefrom.
Figure 19:
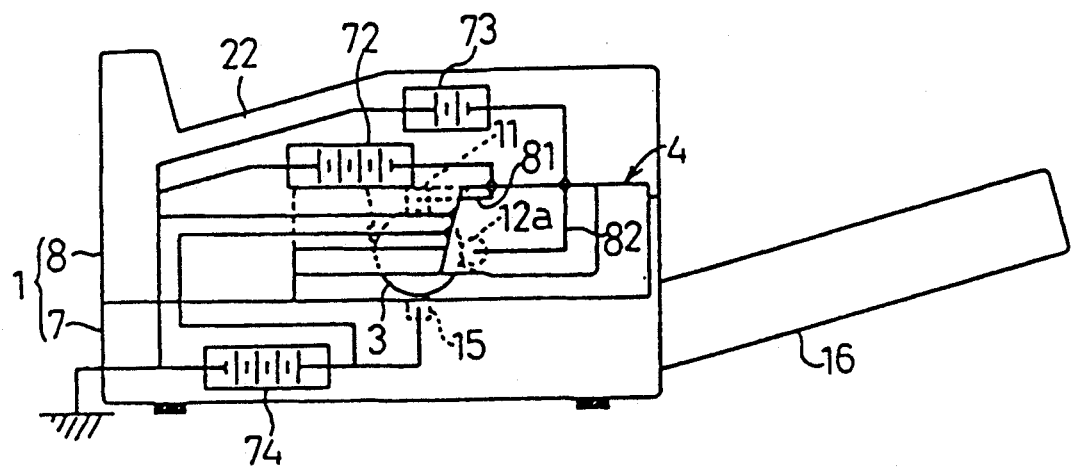
FIG. 19 is a diagram showing the power sources when the image forming unit is installed in the apparatus shown in FIG. 2.

FIG. 18 is a block diagram showing the laser beam printer main body 1 provided with the negative high-voltage power source 72 for charging the drum, negative developing bias power source 73 and positive high-voltage power source 74 for toner transfer. FIG. 19 shows the printer main body 1 having the image forming unit 4 incorporated therein, with the negative high-voltage power source 72 connected to the sensitizing charger 11 and the negative developing bias power source 73 to the developing roller 12a of the developing device 12. Indicated at 81 and 82 are members of wiring provided inside the unit 4 for these connections.

Figure 20:
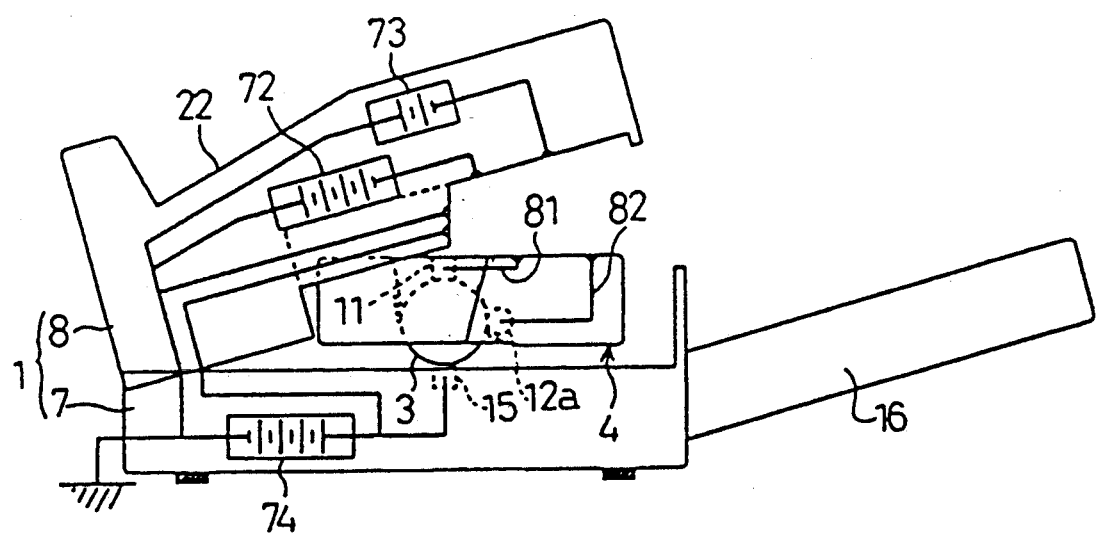
FIG. 20 is a diagram of the power sources in the course of installation of the image forming unit.

FIG. 20 shows the image forming unit 4 in the course of installation in the printer main body 1. It is seen that the unit 4 is electrically disconnected from the power sources 72 and 73.

On the other hand, the copying machine mode requires two high-voltage power sources, i.e., a positive high-voltage power source for drum charging and toner transfer, and a positive developing bias power source.

Figure 21:
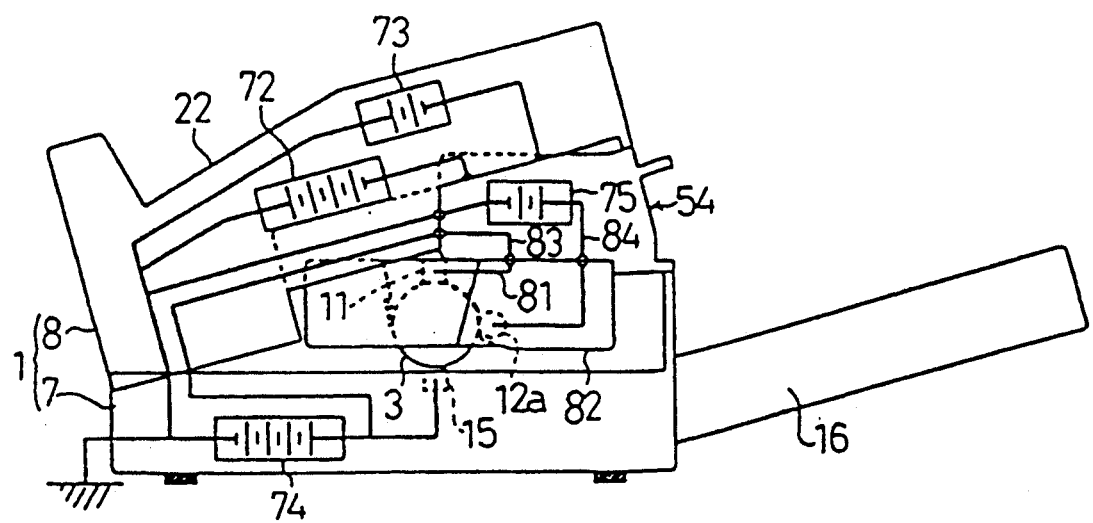
FIG. 21 is a diagram of the power sources when the image forming unit and the document exposure unit are installed in the apparatus shown in FIG. 1.

As previously stated, the positive high-voltage power source 74 is provided in the printer main body 1 and is therefore used for drum charging and toner transfer. However, the printer main body 1 has no positive bias source, so that a positive developing bias power source 75 is provided in the document exposure unit 54 for use in the copying machine mode (see FIG. 21). To use this bias source 75, connecting wiring members 83, 84 are arranged inside the unit 54.

Since the upper frame 8 is positioned away from the image forming unit 4 in the copying machine mode to mount the document exposure unit 54 on the movable frame 31, the sensitizing charger 11 and the developing roller 12a connected to the negative power sources 72, 73 in the printer mode are no longer connected thereto. On the other hand, the developing bias power source 75 of the unit 54 installed is connected to the sensitizing charger 11 and the developing roller 12a by the wiring members 83, 84, and wiring members provided in the printer main body 1. In this way, the charger and the roller are completely changed over for positive power supply.

Preferably, the output of the positive high-voltage power source 75 for transfer is automatically changed to a suitable value upon this change-over although not shown.

Thus, the laser printer main body 1 itself has an essential construction which is compacted to the greatest possible extent to serve the contemplated single function of the laser beam printer, and is provided as an apparatus which is reduced in size, weight and cost. Jams can be removed easily because the upper frame 8 is openable, and the apparatus is easy to maintain because the image forming unit 4 is removable or replaceable.

Moreover, the exposure portion 51 of the photosensitive drum 3 in the image forming unit 4 and the vicinity thereof are left open to the outside when the upper frame 8 is in its opened position to form the open exposure portion 53, in which the document exposure unit 54 is installed when required. Copies can then be produced by exposing the drum 3 to optical images of manually inserted documents instead of the image forming beam from the laser beam scanner 5.

Although the printer described and embodying the invention is so designed that the document exposure unit is installed in the open exposure portion which is formed by opening the upper frame relative to the lower frame, the electrophotographic apparatus of the invention is not limited to this type but can be of any type insofar as the document exposure unit is removably mountable for the exposure portion of the photosensitive member in the printer.

Furthermore, the present invention is applicable not only to laser beam printers but also to optical printers, etc. wherein latent images are formed on a photosensitive member by an LED array or the like.

Although the present invention has been fully described by way of example with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An electrophotographic apparatus comprising:
   first exposure means for projecting a light image formed according to digital image data an exposure portion of a photosensitive member; and
   a document exposure unit attachable to said exposure portion upon releasing said first exposure means from the exposure portion and including a transport system for transporting a document and second exposure means for projecting a document image onto the exposure portion of the photosensitive member.

2. An electrophotographic apparatus as claimed in claim 1 wherein said photosensitive member has sensitivity to both light emitted from the first exposure means and light emitted from the second exposure means, said second exposure means having a different wave length from that of the light emitted from the first exposure means.

3. An electrophotographic apparatus as claimed in claim 1 further comprising:
- a first frame accommodating the first exposure means; and
- a second frame having the photosensitive member and supporting the first frame connected thereto openably, said document exposure unit being attachable to the exposure portion when said first frame is opened relative to said second frame.

4. An electrophotographic apparatus comprising:
- a first frame having accommodated therein an exposure head;
- a second frame having the first frame connected thereto openably and having accommodated therein a photosensitive member and image forming means for forming a visible image by developing an electrostatic latent image formed on the photosensitive member with image forming light emitted from the exposure head;
- an open portion to be formed in the vicinity of an exposure portion of the photosensitive member in the second frame when the first frame is opened relative to the second frame; and
- a document exposure unit mountable in the open portion including a transport system for transporting a document and an exposure optical system for exposing the photosensitive member to an optical image of the document being transported by the transport system.

5. An electrophotographic apparatus as claimed in claim 4 wherein said second frame integrally accommodates the photosensitive member and the image forming means in an imaging cartridge.

6. An electrophotographic apparatus as claimed in claim 5 wherein said second frame has a third frame supporting said imaging cartridge therein and connected to the second frame openably in synchronism with the opening of the first frame relative to the second frame.

7. An electrophotographic apparatus as claimed in claim 6 wherein said open portion is formed between the exposure head and the imaging cartridge by separation of the exposure head and the imaging cartridge.

8. An electrophotographic apparatus as claimed in claim 4 wherein said photosensitive member has sensitivity to both light emitted from the exposure head and light emitted from the exposure optical system, said light emitted from the exposure optical system having a different wave length from that of the light emitted from the exposure head.

9. A method performed in an electrophotographic apparatus comprising an exposure head emitting a light according to digital image data and image forming means for forming an electrostatic latent image on a photosensitive member with a light emitted from the exposure head to the photosensitive member at an exposure portion, said method comprising the steps of:
- releasing said exposure head from the exposure portion;
- attaching to the exposure portion a document exposure unit including an exposure optical system and a document transport system; and
- forming an electrostatic latent image on the photosensitive member with a light emitted from said exposure optical system and reflected from the document transported by said document transport system.

* * * * *